(12) United States Patent
Han et al.

(10) Patent No.: US 8,668,893 B2
(45) Date of Patent: Mar. 11, 2014

(54) CATALYSTS FOR NO$_x$ REDUCTION EMPLOYING H$_2$ AND A METHOD OF REDUCING NO$_x$

(71) Applicant: Heesung Catalysts Corporation, Shuheung (KR)

(72) Inventors: Hyun-Sik Han, Ansan (KR); Eun-Seok Kim, Siheung-si (KR); Gon Seo, Gwangju (KR); Se-Min Park, Yeosiu si (KR); Yun-Je Lee, Buk-Gu (KR)

(73) Assignee: Heesung Catalysts Corporation, Kyeonggi-Do (KR)

( * ) Notice: Subject to any disclaimer, the term of this patent is extended or adjusted under 35 U.S.C. 154(b) by 0 days.

(21) Appl. No.: 13/724,499

(22) Filed: Dec. 21, 2012

(65) Prior Publication Data

US 2013/0156669 A1    Jun. 20, 2013

Related U.S. Application Data (62) Division of application No. 13/056,281, filed as application No. PCT/KR2008/004571 on Aug. 6, 2008, now abandoned.

(30) Foreign Application Priority Data

Jul. 31, 2008    (KR) .......................... 10-2008-0075102

(51) Int. Cl.
*B01D 53/56*    (2006.01)

(52) U.S. Cl.
USPC ....................................................... 423/239.1

(58) Field of Classification Search
USPC ....................................................... 423/239.1
See application file for complete search history.

(56) References Cited

U.S. PATENT DOCUMENTS

| | | | | |
|---|---|---|---|---|
| 3,669,906 | A | * | 6/1972 | Koberstein et al. ........... 502/306 |
| 3,970,739 | A | * | 7/1976 | Shiraishi et al. .............. 423/235 |
| 4,105,590 | A | | 8/1978 | Koberstein et al. |
| 4,105,745 | A | * | 8/1978 | Takeuchi et al. ........... 423/239.1 |
| 6,066,590 | A | * | 5/2000 | Horii et al. .................... 502/324 |
| 2008/0127638 | A1 | | 6/2008 | Vaarkamp et al. |

FOREIGN PATENT DOCUMENTS

| | | |
|---|---|---|
| JP | 10033944 | 2/1998 |
| JP | 10066869 | 3/1998 |
| KR | 200592085 | 6/2006 |
| WO | WO2007/004774 A1 | 1/2007 |

OTHER PUBLICATIONS

Office Action for U.S. Appl. No. 13/056,284 dated Mar. 14, 2013.

* cited by examiner

*Primary Examiner* — Timothy Vanoy
(74) *Attorney, Agent, or Firm* — Meunier Carlin & Curfman, LLC (57) ABSTRACT

Disclosed is a catalyst composition for reducing NOx through two steps including reacting NOx with H2 thus producing ammonia which is then reacted with NOx, instead of direct NOx reduction by H2, and a method of reducing NOx using the catalyst composition.

4 Claims, 11 Drawing Sheets

1. Six Gas Valves
2. Reactor
3. Temperature Controller
4. $NO_x$ Sensor
5. Mass Spectrometer
6. $NO_x$ Analyzer
7. Computer

CATALYSTS FOR NO$_x$ REDUCTION EMPLOYING H$_2$ AND A METHOD OF REDUCING NO$_x$

CROSS REFERENCE TO RELATED APPLICATIONS

This application is a divisional of U.S. application Ser. No. 13/056,281, filed Jan. 27, 2011, which is a 371 U.S. National Phase of PCT/KR08/004,571, filed Aug. 6, 2008, which claims the benefit of priority to Korean application 10-2008-0075102, filed Jul. 31, 2008.

TECHNICAL FIELD

As a system for reducing NO$_x$ from diesel exhaust gas, selective catalytic reduction (SCR) and NO$_x$ storage reduction (NSR) are known. In the SCR method, a reducing agent is continuously sprayed into exhaust gas and selectively reacted with NO$_x$ in a catalyst bed so that NO$_x$ is converted into N$_2$. This method is classified into NH$_3$—SCR, Urea-SCR, HC—SCR and H$_2$—SCR depending on the type of reducing agent such as ammonia, urea, hydrocarbon and H$_2$. On the other hand, in the NSR method, NO$_x$ is stored in an oxidation atmosphere and then desorbed in a reduction atmosphere formed through spray of fuel, thus reducing NO$_x$.

BACKGROUND ART

Generally, NO$_x$ emitted from large-scale boilers or nitric acid plants can be effectively removed through NH$_3$—SCR which supplies ammonia as a reducing agent to a catalyst bed composed of titania-supported vanadia or iron-containing zeolite. Ammonia is highly reactive and selective and is thus very effective for removing NO$_x$ from the exhaust gas of fixed facilities even in the presence of O$_2$. However, the use of ammonia to remove NO$_x$ from diesel exhaust gas is very dangerous because a diesel vehicle should be driven in a state of always being loaded with ammonia which is highly toxic. So, aqueous urea is used instead of ammonia as a reducing agent therein. The urea is decomposed into ammonia and carbon dioxide in the catalyst bed so that NO$_x$ is reduced to N$_2$. Although the urea-SCR method is advantageous because NO$_x$ removal performance is high, it is problematic in that a tank for storing aqueous urea and a device for spraying such urea should be additionally mounted to a diesel vehicle. As has been done for fuel, a sales network of aqueous urea should be constructed. As well, the urea-SCR method is difficult to apply to a diesel vehicle, due to problems including low solubility of urea, freezing, and ammonia slip.

Among the SCR methods, H$_2$—SCR using H$_2$ as a reducing agent instead of the aqueous urea is receiving attention because the construction of an apparatus thereof is simple and there is no concern about secondary pollution. However, it is difficult to construct the supply network of H$_2$ and to load it into a vehicle. Further, O$_2$ in the diesel exhaust gas may first react with H$_2$, undesirably lowering NO$_x$ selective removal efficiency by H$_2$. Thus, the application of the above method has not been considered to date. The reason is described below.

The temperature and O$_2$ content of diesel exhaust gas greatly vary depending on driving conditions of vehicles. During normal high-speed driving, the temperature may be 300° C. or higher and also the O$_2$ content may exceed 10% under lean burn. Further, in order to allow NO$_2$ to be directly reduced to N$_2$ by H$_2$, H$_2$ should be strongly activated. In this case, however, a probability of reacting such H$_2$ with O$_2$ is increased, undesirably lowering the NO$_x$ removal efficiency. Namely, to increase the NO$_x$ removal efficiency by H$_2$, the probability of reacting H$_2$ with O$_2$ should be inhibited while increasing the degree of activation of H$_2$, which is difficult. Hence, limitations are imposed on applying the H$_2$—SCR method to diesel vehicles.

DISCLOSURE

Technical Problem

Accordingly, the present inventors have directed their attention to a method of reducing NO$_x$ using H$_2$ as a reducing agent in the presence of ammonia, in lieu of conventional direct NO$_x$ reduction by H$_2$, to selectively reduce NO$_x$ while inhibiting excessive activation of H$_2$. The present inventors have devised two-step NO$_2$ removal, including activating H$_2$ only to the appropriate level so that it can thus react with NO$_x$, giving ammonia, which is then reacted with NO$_x$.

Therefore, an object of the present invention is to provide a catalyst composition for reducing NO$_x$ through two steps including reacting NO$_x$ with H$_2$, thus preparing ammonia, which is then reacted with NO$_x$, thereby removing NO$_x$, instead of direct NO$_x$ reduction by H$_2$.

Another object of the present invention is to provide a hybrid catalyst composition having not only a function as an SCR catalyst of reaction between a reducing agent and NO$_x$ but also an NSR function for storing NO$_x$ on the surface of the catalyst to thus react with the reducing agent, so that part of the reducing agent is adsorbed on the surface of the catalyst and thus NO$_x$ storage sites are formed, in order to efficiently remove NO$_x$ regardless of changes in the concentration of NO$_x$.

A further object of the present invention is to provide a catalyst composition suitable for a H$_2$—SCR method using H$_2$ as a reducing agent including the two steps of producing ammonia and then removing NO$_x$, in which the temperature range of the catalyst composition usable in diesel vehicles is wide and is on the order of 150~300° C.

Still another object of the present invention is to provide a catalyst composition including the catalyst composition according to the present invention and a conventional NH$_3$—SCR catalyst composition, which are mixed together.

Yet another object of the present invention is to provide a method of reducing NO$_x$ using the catalyst composition.

Technical Solution

In order to accomplish the above objects, the present invention provides a mixed oxide catalyst, a method of preparing the catalyst and a method of reducing NO$_x$ using the catalyst.

According to the present invention, the mixed oxide catalyst for reducing NO$_x$ using H$_2$ as a reducing agent includes one or more selected from the group of A metal oxides consisting of Fe$_2$O$_3$, CO$_2$O$_3$, NiO and CuO, and one or more selected from the group of B metal oxides consisting of V$_2$O$_5$, Cr$_2$O$_3$, MnO$_2$ and MoO$_3$, which are co-precipitated and mixed. The present invention has the following features, but is not limited thereto.

In the mixed oxide catalyst, the weight ratio of A metal oxide to B metal oxide may range from 2:1 to 1:0.5.

On the mixed oxide catalyst, a precious metal selected from the group consisting of Pt and Pd may be supported in an amount of 0.1~2 wt %.

The mixed oxide catalyst may further include a conventional NH$_3$—SCR catalyst. As such, an example of the conventional $NH_3$—SCR catalyst may include, but is not limited to, a titania-supported vanadia catalyst or an iron-containing zeolite catalyst.

In addition, the method of preparing the mixed oxide catalyst for reducing $NO_x$ using $H_2$ as a reducing agent includes dissolving in aqueous nitrate or acetate one or more metal oxide precursors selected from the group of A metal oxides consisting of $Fe_2O_3$, $Co_2O_3$, NiO and CuO, and one or more metal oxide precursors selected from the group of B metal oxides consisting of $V_2O_5$, $Cr_2O_3$, $MnO_2$ and $MoO_3$, thus obtaining a solution, adding barium nitrate for improving structural stability of the mixed oxide to the solution, adding ammonia water or aqueous sodium bicarbonate as a precipitating agent to the solution so that pH of the solution is 7~7.3, thus forming a precipitate, and subjecting the precipitate to post treatment including filtering, washing, drying and burning. The present invention has the following features, but is not limited thereto.

In the method, the ratio of A metal oxide precursor to B metal oxide precursor may range from 2:1 to 1:0.5.

The method may further include, after subjecting the precipitate to post treatment, supporting either or both precious metals of Pt and Pd in an amount of 0.1~2 wt % on the catalyst, burning the precious metal-supported catalyst, and subjecting the burned catalyst to reduction treatment using a gas mixture containing $N_2$ and $H_2$ at a molar ratio of 1.

In addition, the method of reducing $NO_x$ includes reducing $NO_x$ at 150~350° C. using $H_2$ as a reducing agent in the presence of the above mixed oxide catalyst. This method may be performed even under conditions in which $O_2$ content is 0~10% by volume based on the volume of $NO_x$, but the present invention is not limited thereto.

Advantageous Effects

According to the present invention, oxides of A metals including Cu, Fe, Co and Ni and oxides of B metals including Cr, Mn, Mo and V are co-precipitated and mixed, thus preparing mixed oxide catalysts and ternary mixed oxide catalysts. These catalysts exhibit superior activity for production of ammonia through selective reaction between $NO_2$ and $H_2$ even in the presence of 5% or 10% $O_2$, and simultaneously, manifest very high $NO_2$ and $NO_x$ storage performance. Thereby, the catalysts can exhibit superior $NO_x$ reduction performance through injection of $H_2$ even in the presence of $O_2$. In particular, because $NO_x$ is removed via ammonia, the $NO_x$ removal performance is high. The catalysts according to the present invention have high Pt or Pd dispersability and high hydrothermal stability and poisoning resistance to sulfur and thus can significantly remove $NO_x$ from diesel exhaust gas. Also, the catalysts can be typically easily prepared from transition metal precursors which are inexpensive with high durability to water or heat and to sulfur poisoning.

DESCRIPTION OF DRAWINGS

FIG. 2 shows X-ray diffraction patterns of A-B mixed oxide catalysts in which the A metal is (FIG. 2A) Cu and the B metal is Cr, V, or Mo and (FIG. 2B) the A metal is Cu and the B metal is Mn, a Cr—Mn catalyst, and a Fe—Mn catalyst, after a burning process;

FIG. 3 shows X-ray diffraction patterns of Pt(2.0)Cu—Cr (bottom FIG. 3B) and Pt(2.0)-Fe—Mn catalysts (FIGS. 3A and 3B), which are Pt-supported catalysts;

FIG. 4 shows IR spectra of the process of storing $NO_2$ (FIG. 4A) and the process of reducing $NO_2$ by $H_2$ (FIG. 4B) in the Cu—Cr catalyst;

FIG. 5 shows IR spectra of the process of producing ammonia from $NO_2$ through injection of $H_2$ in the absence of $O_2$ (FIG. 5A) and in the presence of $O_2$ (FIG. 5B) in the Cu—Cr catalyst which is a mixed oxide catalyst;

FIG. 6 shows IR spectra of the Cu—Mn catalyst (FIG. 6C), the Fe—Cr catalyst (FIG. 6A) and the Fe—Mn catalyst (FIG. 6B) in the presence of $O_2$;

FIG. 8 shows $NO_2$ reduction results by $H_2$ of the Pt(2.0)-Fe catalyst (FIG. 8A), the Pt(2.0)-Mn catalyst (FIG. 8B) and the Pt(2.0)-Fe—Mn catalyst (FIG. 8C) under flow of 500 ppm $NO_2$ containing 10% $O_2$.

MODE FOR INVENTION

A catalyst for effectively and selectively reducing $NO_x$ using $H_2$ gas in the presence of $O_2$ should have the following three functions, namely, high $NO_x$ adsorption, appropriate activation of $H_2$, and activation of adsorbed $NO_x$. Specifically, $NO_x$ is adsorbed or stored on the surface of the catalyst because of having reacted therewith and thus should be concentrated on the catalyst. In this case, part of $NO_x$ should be activated so that it is converted into ammonia through reaction with $H_2$. As well, when $H_2$ is adsorbed on the surface of the catalyst and thus activated in an atomic state, it may be reacted with $NO_x$, thus producing ammonia.

Taking into consideration the above reasons, the present inventors selected, as oxides of A metals which exhibit superior $NO_x$ storage performance, $Fe_2O_3$, $Co_2O_3$, NiO and CuO, and as oxides of B metals which are able to adsorb $NO_x$ in an activated state, $V_2O_5$, $Cr_2O_3$, $MnO_2$ and $MoO_3$. In the present invention, the oxides of the A and B metals are co-precipitated and combined, thus preparing mixed oxides, thereby maximizing $NO_x$ storage capacity and $NO_x$ reduction performance at the same time. Further, to inhibit the sintering of the B metal, barium nitrate is added as a structure stabilizer. As a precious metal, Pt or Pd is supported on the catalyst. Depending on the type of catalyst, two or more kinds of A metal or B metal are added, thus preparing ternary or more mixed oxide catalysts, after which a precious metal is supported thereon. Accordingly, $H_2$ is activated in an atomic state on the surface of precious metal to thus react with $NO_x$ adsorbed on the surface of the mixed oxide, thereby producing ammonia. In the present invention, the mixed oxide according to the present invention promotes the ammonia and $NO_x$ reduction and ultimately reduces $NO_x$ to $N_2$.

For mass production of the mixed oxide catalyst at low cost, a general co-precipitation method is applied, and inexpensive starting materials are used. When ammonia water or sodium bicarbonate is added to the mixed solution to appropriately adjust the pH of the solution, a highly active catalyst is prepared. The precious metal is supported in an amount of 0.1~2%, and the reduction reaction is operated in the temperature range of 150~350° C. Even when the concentration of $O_2$ in $NO_x$ exceeds 10% by volume, the above catalyst can exhibit superior $NO_x$ selective reduction by $H_2$.

A better understanding of the present invention may be obtained through the following examples which are set forth to illustrate, but are not to be construed to limit the present invention.

Example 1

Preparation of Mixed Oxide Catalysts

Mixed oxide catalysts were prepared from oxides of A metals (Cu, Fe, Co, Ni) and B metals (Cr, Mn, Mo, V) through co-precipitation and mixing. The weight ratio of A metal oxide to B metal oxide was adjusted to 2, 1 and 0.5. As a precipitating agent, ammonia water or aqueous sodium bicarbonate was used, and pH of the mixed solution was adjusted to 6.0~8.0. Any one A metal was reacted with any one B metal, thus preparing binary mixed oxide catalysts, and also, multicomponent mixed oxide catalysts were prepared using two or more kinds of these metals. The method of preparing some catalysts which are regarded as important is described below.

a) Cu—Cr Mixed Oxide Catalyst

A solution of 15.2 g of copper nitrate and 1.60 g of barium nitrate in 152 g of water was mixed with a solution of 15.4 g of potassium dichromate in 154 g of water, thus preparing a mixed solution. For sufficient mixing, the mixed solution was stirred for 30 min and then ammonia water was slowly added thereto so that the pH thereof was 7.0~7.5. The resultant precipitate was filtered using filter paper, sufficiently dried in an oven at 80° C., and then ground using a mortar and a pestle, thus obtaining fine powder. The powder was transferred into an electric furnace so that it was burned at 500° C. for 4 hours, giving 10.9 g of a Cu—Cr mixed oxide catalyst represented by a Cu—Cr catalyst.

b) Fe—Cr Mixed Oxide Catalyst

A solution of 24.7 g of iron nitrate and 1.6 g of barium nitrate in 247 g of water and a solution of 15.4 g of potassium dichromate in 154 g of water were prepared. These two solutions were mixed and stirred for 30 min to provide for sufficient mixing, after which ammonia water was slowly added thereto so that the pH thereof was 7.0~8.0. The resultant precipitate was filtered using filter paper, dried in an oven at 80° C., and then ground using a mortar and a pestle, thus obtaining fine powder. The powder was transferred into an electric furnace so that it was burned at 500° C. for 4 hours, giving 8.5 g of a Fe—Cr mixed oxide catalyst represented by a Fe—Cr catalyst.

c) Cu—Mn Mixed Oxide Catalyst

A solution of 20.6 g of copper nitrate in 206 g of water and a solution of 24.6 g of manganese nitrate in 246 g of water were prepared. These two solutions were sufficiently mixed for 30 min, after which a 1 M sodium bicarbonate solution was slowly added thereto so that the pH thereof was 7.0~7.8. The resultant precipitate was filtered using filter paper, dried in an oven at 80° C., and then ground using a mortar and a pestle, thus obtaining fine powder. The powder was transferred into an electric furnace so that it was burned at 500° C. for 4 hours, giving 21 g of a Cu—Mn mixed oxide catalyst represented by a Cu—Mn catalyst.

d) Fe—Mn Mixed Oxide Catalyst

A solution of 35.9 g of iron nitrate in 359 g of water and a solution of 25.5 g of manganese nitrate in 255 g of water were prepared. These two solutions were sufficiently mixed for 30 min, after which a 1M sodium bicarbonate solution was slowly added thereto so that the pH thereof was 6.5~7.5. The resultant precipitate was filtered using filter paper, dried in an oven at 80° C., and then ground using a mortar and a pestle, thus obtaining fine powder. The powder was transferred into an electric furnace so that it was burned at 500° C. for 4 hours, giving 15 g of a Fe—Mn mixed oxide catalyst represented by a Fe—Mn catalyst.

e) Mn—Cr Mixed Oxide Catalyst

A solution of 17.6 g of manganese nitrate and 1.6 g of barium nitrate in 176 g of water and a solution of 15.4 g of potassium dichromate in 154 g of water were prepared. These two solutions were mixed and stirred for 30 min to provide for sufficient mixing, after which ammonia water was slowly added thereto so that the pH thereof was 7.0~7.5. The resultant precipitate was filtered using filter paper, dried in an oven at 80° C., and then ground using a mortar and a pestle, thus obtaining fine powder. The powder was transferred into an electric furnace so that it was burned at 500° C. for 4 hours, giving 12.1 g of a Mn—Cr mixed oxide catalyst represented by a Mn—Cr catalyst.

The other mixed oxide catalysts were prepared through the above procedures. Also, mixed oxide catalysts having a composition ratio of 2 and 0.5, in addition to 1, were prepared. Each of the catalysts thus prepared was reduced under flow of a reducing gas mixture containing $H_2$ and $N_2$ at a molar ratio of 1:1 at 400° C. and a flow rate of 120 ml/min, before being used.

f) Synthesis of Fe-BEA Zeolite ($NH_3$—SCR Catalyst)

To a solution of 377 g of tetraethyl ammonium hydroxide and 312 g of colloidal silica, 31 g of sodium aluminate was dropped with stirring, thus preparing a synthesis mother solution having a composition of $1.5Na_2O:20SiO_2: Al_2O_3$: 2.46 $(TEA)_2O:416H_2O$. This solution was stirred for 2 hours, placed in a high-pressure autoclave and thus heated to 165° C. for 3 hours, and then subjected to hydrothermal reaction while maintaining the above temperature for 90 hours, thus obtaining 28 g of BEA zeolite having a molar ratio of Si/Al of 10.10 g of the synthesized BEA zeolite was added to 100 ml of a 0.2 N iron chloride solution, ion-exchanged at 60° C. for two days, filtered, washed, and then burned, giving Fe-ion-exchanged Fe-BEA zeolite.

Example 2

Preparation of Pt- or Pd-supported Mixed Oxide Catalyst

To evaluate $NO_2$ reduction performance by a $H_2$ reducing agent, Pt was supported in an amount of 0.1, 0.2, 1.0 and 2.0% by weight on the mixed oxide catalyst of Example 1. As a Pt precursor, hexachloroplatinic acid was dissolved in an amount of each of 0.1, 0.2, 1.1 and 2.1 g in 35 g of water, thus preparing a Pt solution, which was then added to 50 g of the mixed oxide catalyst. The catalyst reached equilibrium after 24 hours, and then dried in an oven at 80° C. and thus dewatered. The solution was burned in an electric furnace at 400° C. for 2 hours, placed in a quartz tube and then subjected to reduction treatment using a gas mixture containing $N_2$ and $H_2$ mixed at an equal ratio. The Pt-supported Cu—Cr catalysts and Fe—Mn catalysts were represented by Pt(0.1)-Cu—Cr, Pt(0.2)-Cu—Cr, Pt(1.0)-Cu—Cr, Pt(2.0)-Cu—Cr, Pt(0.1)-Fe—Mn, Pt(0.2)-Fe—Mn, Pt(1.0)-Fe—Mn, and Pt(2.0)-Fe—Mn.

On the other hand, Pd-supported mixed oxide catalysts were prepared using a palladium nitrate precursor through procedures similar to the above Pt supporting procedures. Specifically, palladium nitrate was dissolved in an amount of each of 0.1, 0.2, 1.1 and 2.2 g in 35 g of water, thus preparing a Pd solution which was then added to 50 g of the mixed oxide catalyst, dried, burned in an electric furnace at 400° C. for 2 hours, and then subjected to reduction treatment, yielding Pd-supported mixed oxide catalysts. The Pd-supported Cu—Cr catalysts and Fe—Mn catalysts were represented by Pd(0.1)-Cu—Cr, Pd(0.2)-Cu—Cr, Pd(1.0)-Cu—Cr, Pd(2.0)-Cu—Cr, Pd(0.1)-Fe—Mn, Pd(0.2)-Fe—Mn, Pd(1.0)-Fe—Mn, and Pd(2.0)-Fe—Mn.

Example 3

X-Ray Diffraction Pattern of A-B Mixed Oxide Catalyst

Figure 1:
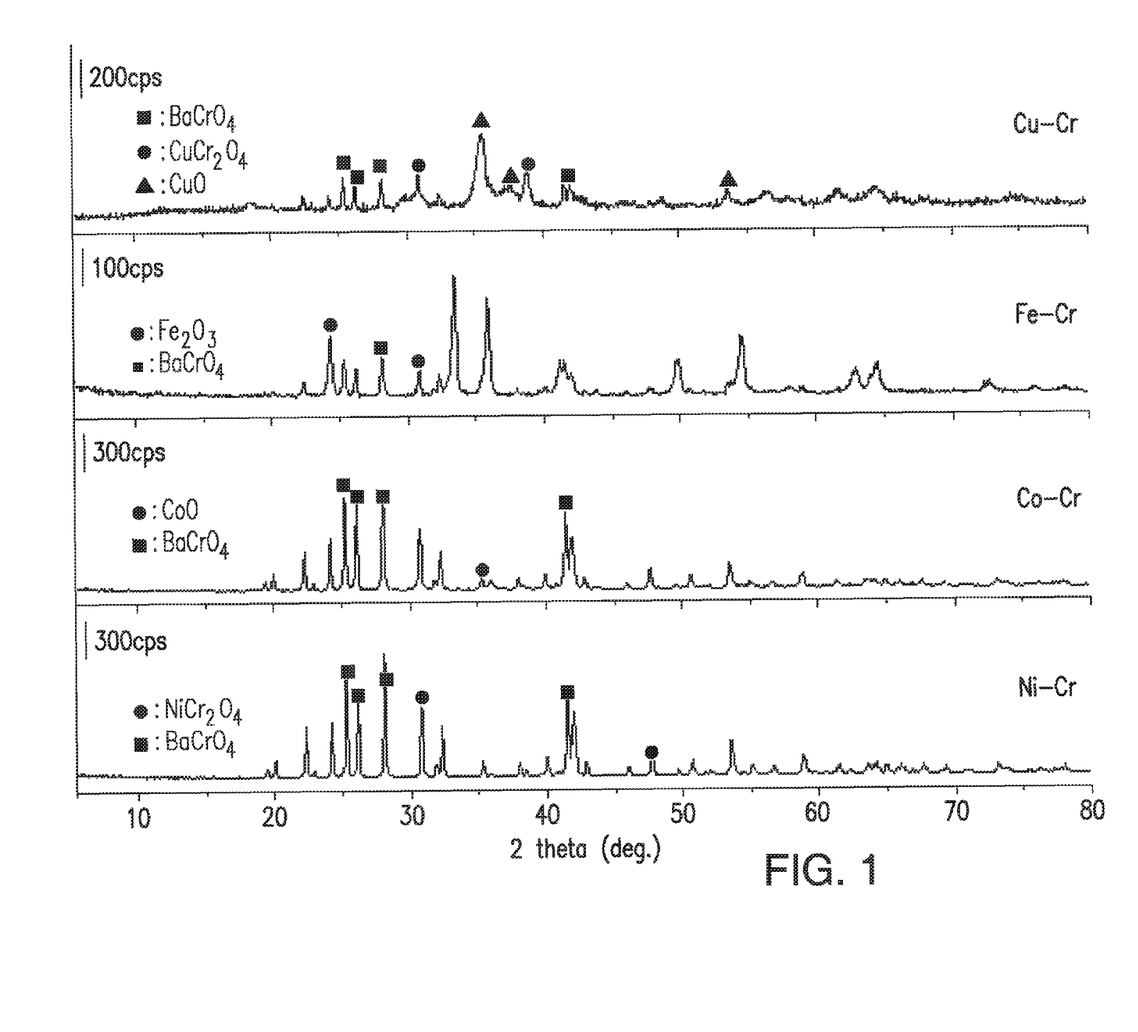
FIG. 1 shows X-ray diffraction patterns of A-B mixed oxide catalysts in which the B metal is Cr and the A metal is Fe, Co, Ni and Cu, after a burning process.

Among the A-B mixed oxide catalysts prepared in Example 1, the catalysts in which the B metal was Cr and the A metal was Fe, Co, Ni and Cu were burned, after which X-ray diffraction patterns thereof were measured. The results are shown in FIG. 1. The diffraction pattern of the mixed oxide catalyst was very complicated because the diffraction peaks of metal oxides alone and in combinations thereof coexisted. In the Cu—Cr catalyst, the diffraction peaks of CuO, $CuCr_2O_4$ and $BaCrO_4$ were shown. In any catalyst, the diffraction peak of $BaCrO_4$ added to improve structural stability of the catalyst was distinctly observed. In the Cu—Cr and Fe—Cr catalysts, the diffraction peak of CuO or $Fe_2O_3$ was strongly observed. In the Fe—Cr and Co—Cr catalysts, the diffraction peaks difficult to confirm were present, and thus the mixed oxide catalysts were seen to have a complicated structure.

Figure 2A:
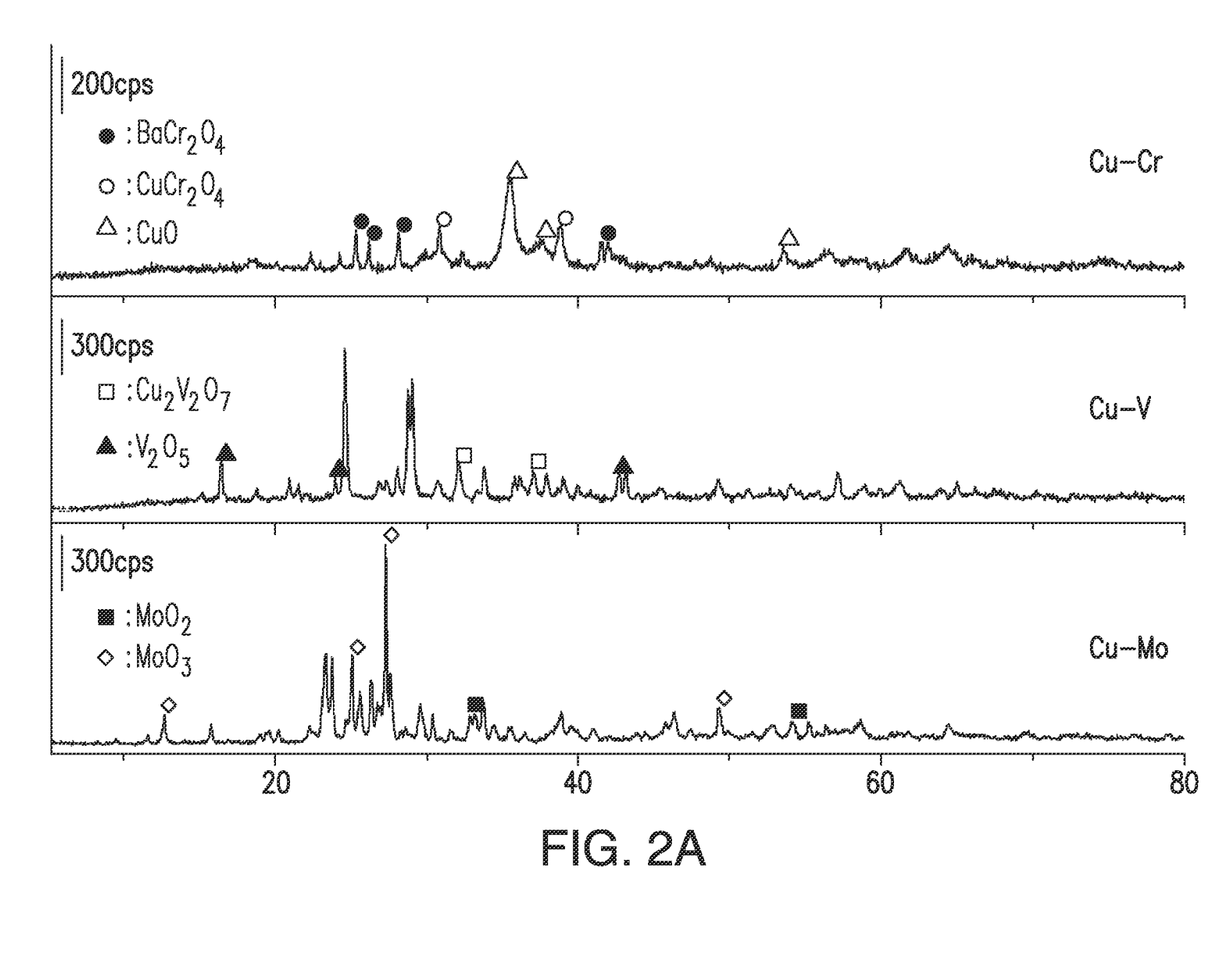
Figure 2B:
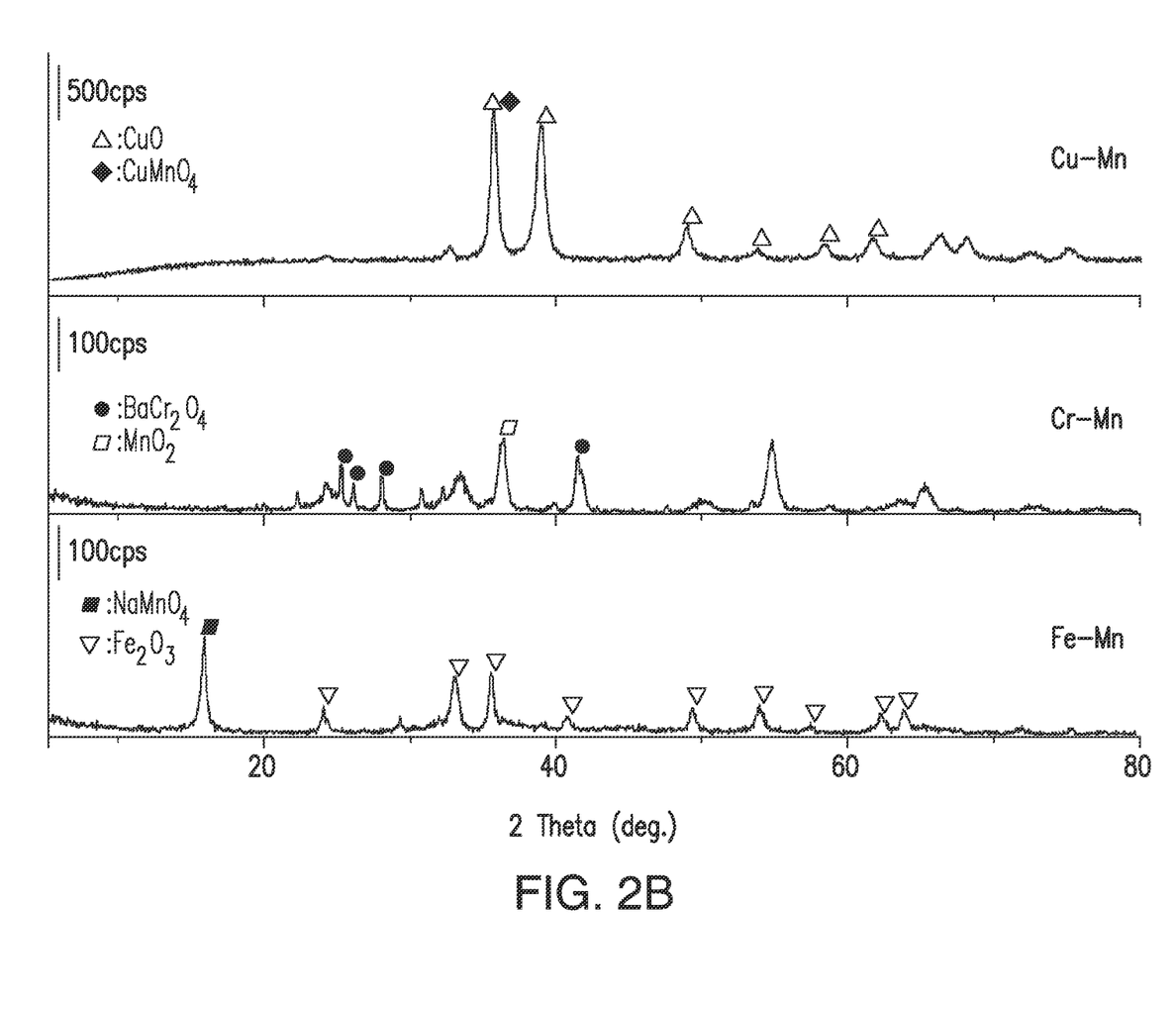

FIG. 2 shows the X-ray diffraction patterns of the A-B mixed oxide catalysts in which the A metal was set and the kind of B metal was changed to Cr, V, Mo and Mn. In the Cu—V catalyst, the diffraction peaks of $Cu_2V_2O_7$ and $V_2O_5$ were observed. In the Cu—Mn catalyst, the peak of CuO and $CuMnO_4$ was observed together. Whereas, in the Cu—Mo catalyst, the diffraction peak of the copper compound was unclear, and only the diffraction peaks of $MoO_2$ and $MoO_3$ were greatly observed. The diffraction peaks of the Cr—Mn catalyst prepared from only B metals and the Fe—Mn catalyst prepared through crossing of A-B metals were observed. Depending on the kind of metal, the diffraction pattern of the catalyst was seen to considerably vary. In the Cu—Mn catalyst, the diffraction peaks of CuO and $CuMnO_4$ were observed, whereas in the Cr—Mn catalyst the diffraction peaks of $MnO_2$ and $BaCrO_4$ were observed. Also, in the Fe—Mn catalyst, the diffraction peaks of $Fe_2O_3$ and $NaMnO_4$ were observed. From this, the oxides of A and B metals could be seen to be present in different forms depending on the kind of metal.

Figure 3A:
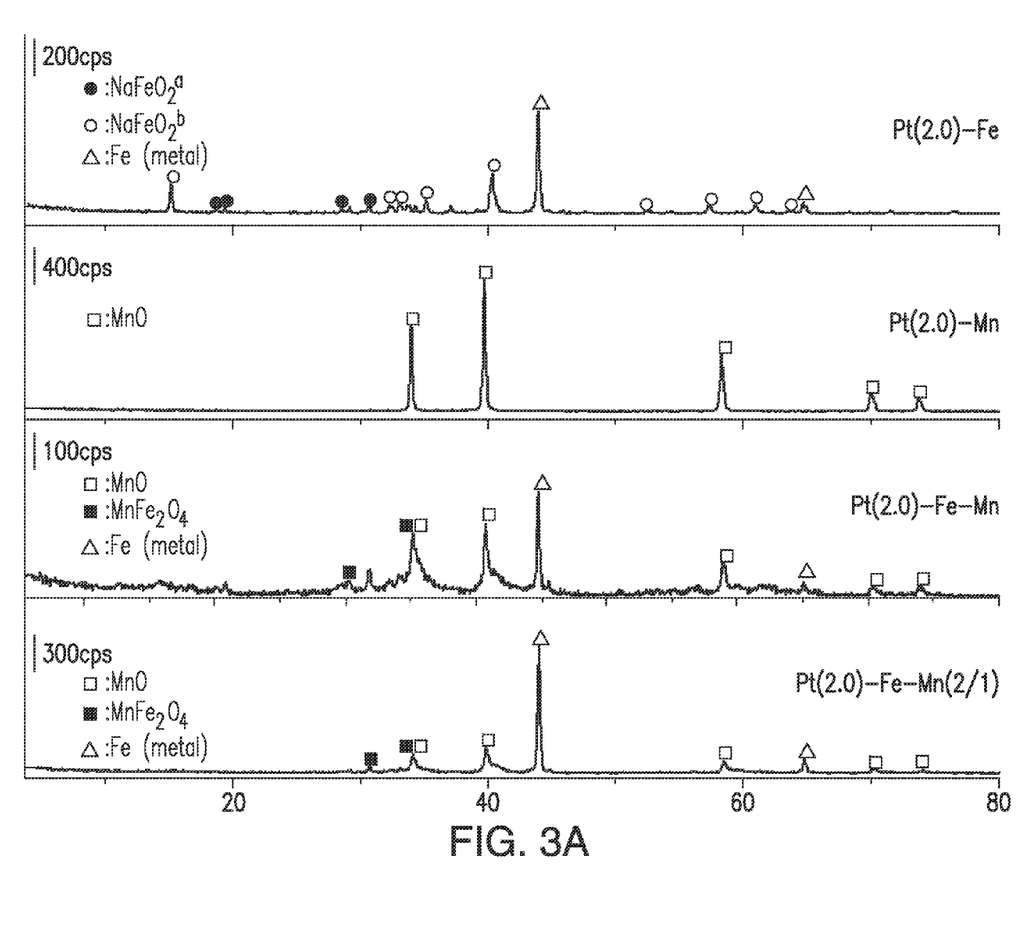
Figure 3B:
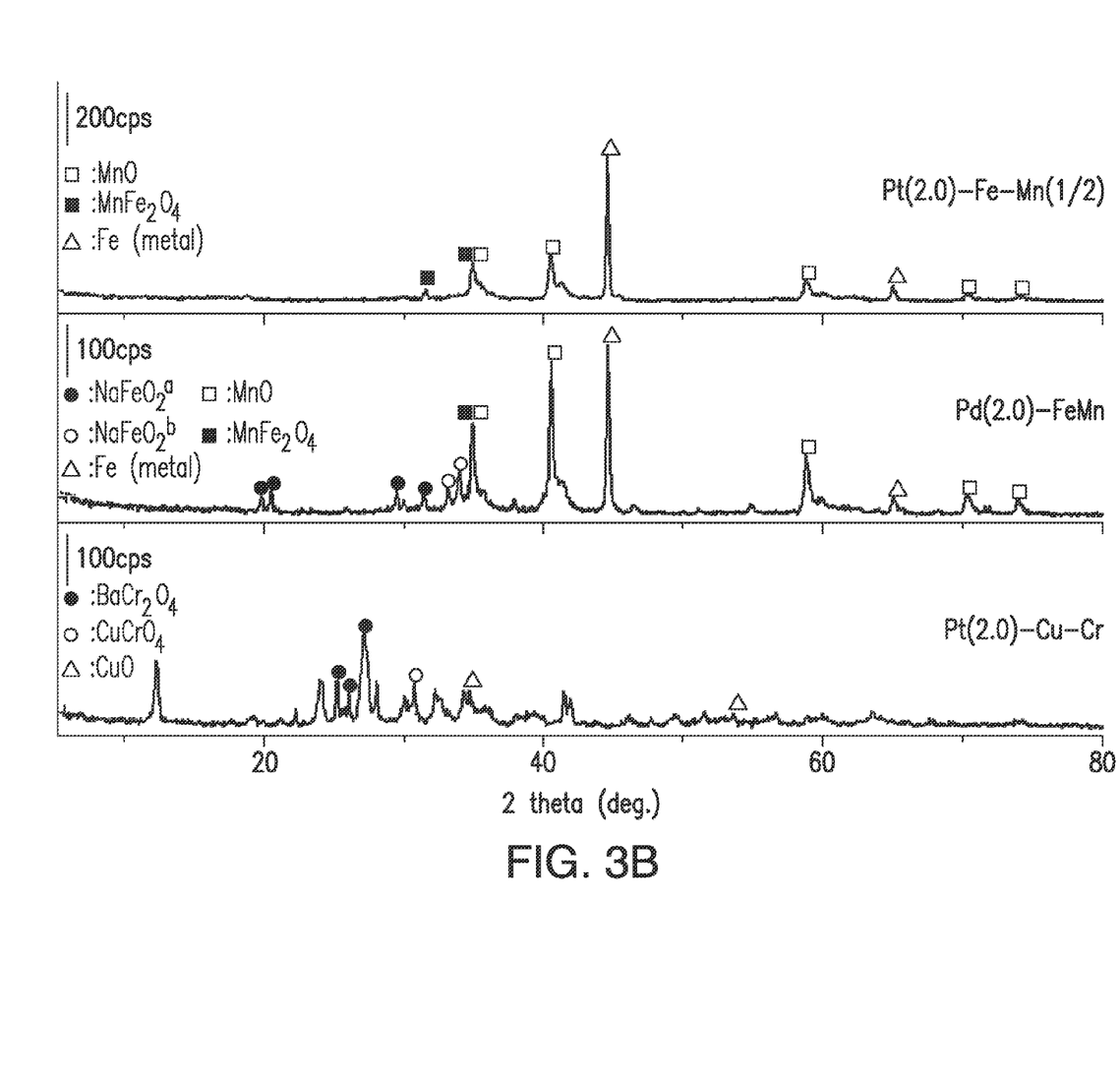

FIG. 3 shows X-ray diffraction patterns of, as Pt-supported catalysts, Pt(2.0)-Fe, Pt(2.0)-Mn, Pt(2.0)-Fe—Mn, Pt(2.0)-Fe—Mn(2/1) and Pt(2.0)-Fe—Mn(1/2) having different Fe/Mn composition ratios, and Pt(2.0)-Cu—Cr catalysts, and as a Pd-supported catalyst, Pd(2.0)-Fe—Mn, which were prepared in Example 2. In the Pt(2.0)-Fe catalyst, the diffraction peaks of $NaFeO_2$ and Fe metal were observed. In the Pt(2.0)-Mn catalyst, the diffraction peaks of MnO were greatly observed. In the Pt(2.0)-Fe—Mn, Pt(2.0)-Fe—Mn(2/1) and Pt(2.0)-Fe—Mn(1/2) catalysts containing Fe and Mn, not only the diffraction peaks of MnO and Fe metal but also the diffraction peak of $MnFe_2O_4$ were observed, from which it could be seen that Fe and Mn were not present alone. The diffraction peak of the Pd-supported catalyst, namely, the Pd(2.0)-Fe—Mn catalyst was similar to that of the Pt-supported catalyst, namely, Pt(2.0)-Fe—Mn catalyst, with the exception that the diffraction peaks of $NaFeO_2$ were weakly observed. The Pt(2.0)-Cu—Cr catalyst had complicated diffraction peaks, unlike the Cu—Cr catalyst. The diffraction peak of Pt in all of these catalysts was not observed. This was judged to be because Pt did not aggregate on the surface of the catalyst but was well dispersed thereon.

Example 4

$NO_2$ Storage Performance of Mixed Oxide Catalyst

The $NO_2$ storage performance of the catalysts prepared in Examples 1 and 2 was evaluated. To this end, the catalyst was loaded into a gravimetric adsorption system provided with a quartz spring and then exhausted at 300° C. for 1 hour, after which measurement was performed at 150° C. in consideration of the temperature of diesel exhaust gas. The results of measurement of the storage performance of the Cu—Cr catalyst and the Fe—Mn catalyst among the above mixed oxide catalysts are summarized in Table 1 below. The $NO_2$ storage performance of the catalyst was greatly changed depending on catalyst pretreatment conditions. The storage performance was represented into a storage amount in a state where the catalyst was exposed to $NO_2$ at 30 Torr and a storage amount in a state where $NO_2$ was emitted. Before reduction treatment, an adsorption amount was slightly larger than the storage amount. However, after the reduction treatment, the adsorption amount became similar to the storage amount. This is considered to be because part of $NO_2$ is weakly adsorbed on the surface of the catalyst before the reduction treatment, but the entirety thereof is strongly stored thereon after the reduction treatment. Thus, the performance of the catalyst was determined only by the storage amount with no consideration being given to the adsorption amount. In the case of the Fe catalyst prepared from only Fe, the amount of stored $NO_2$ was increased about 23 times from 7 mg/g to 161 mg/g through reduction treatment. Also, in the case of the Mn catalyst prepared from only Mn, the amount of stored $NO_2$ was increased about 6 times from 13 mg/g to 79 mg/g through the reduction treatment. The Fe—Mn mixed oxide catalyst containing these two components increased the storage amount about 7 times before the reduction treatment but about 2 times after the reduction treatment, compared to that of the catalyst composed exclusively of Fe or Mn. In the case of the Fe—Mn catalyst, the amount of stored $NO_2$ was remarkably larger than that of the Cu—Cr catalyst, and thus the $NO_2$ storage performance could be seen to greatly vary depending on the kind of metal. As such, although the storage amount may vary depending on the kind of metal and the reduction treatment, $NO_2$ may be typically adsorbed in a large amount on many O vacancies formed on the surface of the catalyst after the reduction treatment. After the reduction treatment, the amount of $NO_2$ stored on the Fe—Mn catalyst was 174 mg/g, which was evaluated to be superior.

Table 1 below shows the $NO_2$ adsorption and storage amounts of the mixed oxide catalysts at 50° C.

TABLE 1

| | $NO_2$ Adsorption and Storage Amounts (mg/g) | | | |
| --- | --- | --- | --- | --- |
| | Before Reduction | | After Reduction | |
| Catalyst | Adsorption Amount | Storage Amount | Adsorption Amount | Storage Amount |
| Fe | 15 | 7 | 161 | 161 |
| Mn | 24 | 13 | 79 | 79 |
| Fe—Mn | 90 | 83 | 174 | 174 |
| Cu—Cr | 22 | 15 | 50 | 43 |
| Pt (2.0)—Fe | — | — | 254 | 254 |
| Pt (2.0)—Mn | — | — | 106 | 106 |
| Pt (2.0)—Fe—Mn | — | — | 182 | 181 |
| Pt (2.0)—Cu—Cr | — | — | 39 | 36 |

Figure 4A:
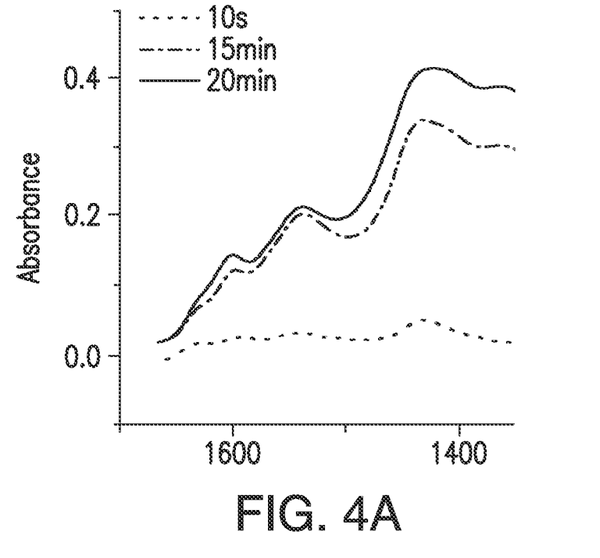
Figure 4B:
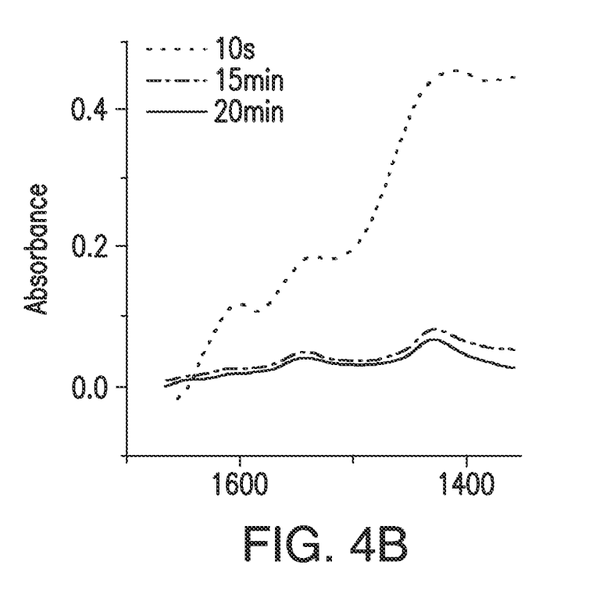

When Pt was supported on the metal oxide catalyst, the amount of stored $NO_2$ was greatly changed. After reduction treatment of the precious metal-supported catalyst, namely, the Pt(2.0)-Fe catalyst, the amount of stored $NO_2$ was 254 mg/g, which was esteemed to be very high. The Pt(2.0)-Mn catalyst also increased the storage amount from 79 mg/g to 106 mg/g, which was smaller than that of the Pt(2.0)-Fe catalyst. The Pt(2.0)-Fe—Mn catalyst slightly increased the storage amount from 170 mg/g to 181 mg/g, compared to that of the Fe—Mn catalyst containing no Pt. However, the Cu—Cr catalyst slightly decreased the storage amount from 43 mg/g to 36 mg/g when Pt was supported thereon. This is considered to be because, when Pt is supported, the activation of $H_2$ is increased upon reduction treatment and thus many O vacancies of the surface of the catalyst are formed. However, in the case of the Pt(2.0)-Cu—Cr catalyst, the amount of stored $NO_2$ was decreased, and thus the storage performance of the catalyst could be seen to greatly vary depending on the kind of metal. The storage state of the adsorbed NO was checked using an IR spectrometer (BIO-RAD, 175C) equipped with an in-situ cell. The $NO_2$ storage behavior and the $NO_2$ desorption behavior by $H_2$ in the Pt(2.0)-Cu—Cr catalyst of Example 1 are shown in FIG. 4. The reduction treatment was performed at 250° C. using $H_2$ at a flow rate of 100 ml/min, after which 2000 ppm $NO_2$ by volume was allowed to flow at 200° C. and thus the process of storing $NO_2$ was measured (a). Also, while $N_2$ gas containing 20% $H_2$ by volume was allowed to flow, the process of desorbing the stored $NO_2$ was measured (b). When $NO_2$ was stored, initial absorption bands were shown at 1540, 1420 and 1240 $cm^{-1}$. After 10 min, the absorption bands were greatly increased at 1440 and 1340 $cm^1$. Initially, $NO_2$ was stored in the form of bidentate nitrate and ionic nitrite, and then was converted into ionic nitrate over time. When $H_2$ was allowed to flow to the Pt(2.0)-Cu—Cr catalyst to which $NO_2$ was stored, the absorption bands were rapidly decreased and then almost none thereof was seen after 15 min. This was because $NO_2$ stored on the catalyst by $H_2$ was rapidly reduced and desorbed.

Example 5

Production of Ammonia in Mixed Oxide Catalyst

In the mixed oxide catalyst, ammonia was produced through reaction between $H_2$ and $NO_2$. The produced ammonia was strongly adsorbed on acid sites and could thus be detected using an IR spectrometer used in Example 4. A mesoporous material (MCM-41) having a sulfonic acid group able to strongly adsorb ammonia was used as a test catalyst. The test catalyst was fixed to the path through which IR beams were passed. While the catalyst was heated to 250° C. using a heater, $H_2$ was added at 30 Torr and thus reduction treatment was performed for 1 hour. After exhaust, $NO_2$ was fed at 20 Torr at the same temperature. Because $NO_2$ was not stored on acid sites, there was no difference in the test sample. Subsequently, $H_2$ was added at 20 Torr so that the reaction was performed for 20 min and cooling to 50° C. was performed, thus checking whether ammonia was produced.

Figure 5A:
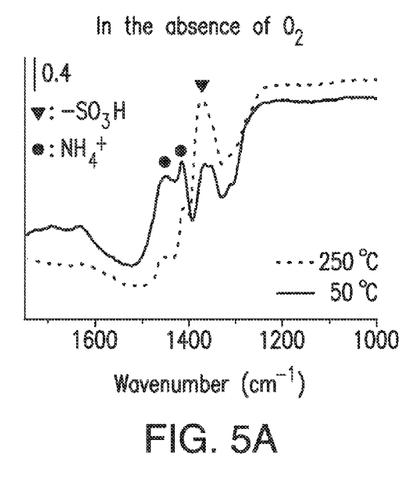
Figure 5B:
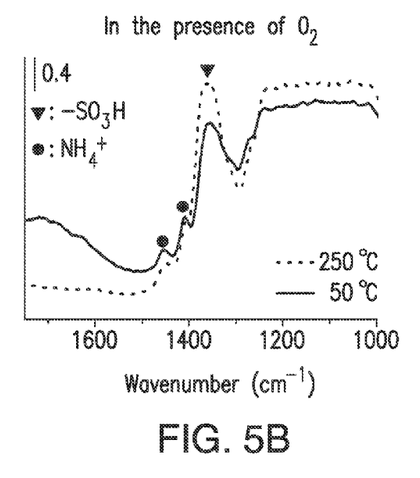

To evaluate the effect of $O_2$, $O_2$ was added at 20 Torr after $NO_2$ adsorption. FIG. 5 shows the results of the production of ammonia by adding $H_2$ to the Cu—Cr mixed oxide catalyst of Example 1 to which $NO_2$ was adsorbed, in the absence of $O_2$ (a) and in the presence of $O_2$ (b). In the absence of $O_2$, reduction treatment was performed at 250° C., after which the absorption band of sulfonic acid was greatly observed at 1377 $cm^{-1}$. However, when $H_2$ was injected and reaction and then cooling to 50° C. were performed, the absorption band at 1377 $cm^{-1}$ became small and novel absorption bands were shown at 1440 and 1410 $cm^{-1}$. From these absorption bands shown due to the presence of the ammonium ion, ammonia could be confirmed to be produced and adsorbed to the sulfonic acid group. While ammonia was produced and adsorbed to the sulfonic acid group, the absorption band at 1377 $cm^{-1}$ was decreased, and the absorption band of ammonium ion was shown. In the presence of $O_2$, the absorption bands of ammonium ion were observed at 1440 and 1410 $cm^{-1}$, which were smaller than in the absence of $O_2$. This means that ammonia was produced through reaction between $NO_2$ and $H_2$.

Figure 6A:
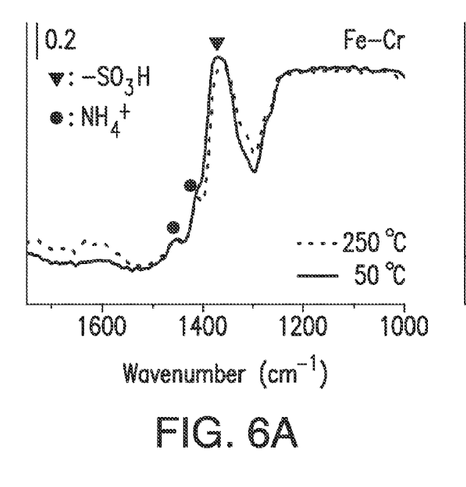
Figure 6B:
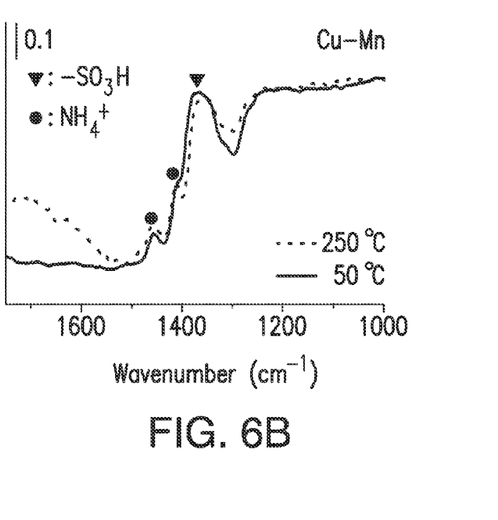
Figure 6C:
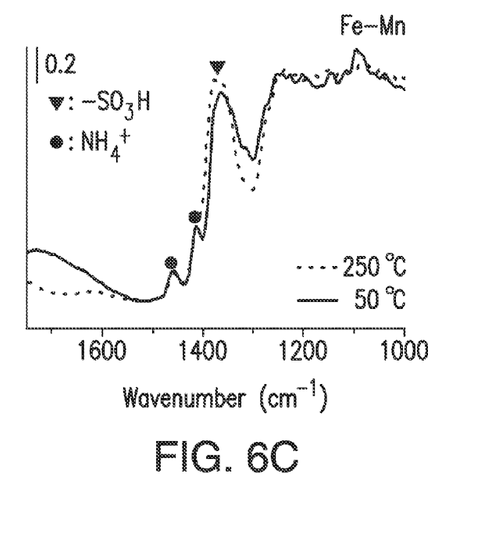

FIG. 6 shows IR spectra of the Cu—Mn catalyst, the Fe—Cr catalyst and the Fe—Mn catalyst, in addition to the Cu—Cr catalyst, in the presence of $O_2$. As in the Cu—Cr catalyst, the absorption bands of ammonium ion were shown at 1440 and 1410 $cm^{-1}$ in the presence of $O_2$, although being small. As such, the degree of production of ammonia greatly varied depending on the kind of component of the catalyst. In the case of the Fe—Cr catalyst and the Cu—Mn catalyst, the absorption band of ammonium ion was very small. In the Fe—Mn catalyst, the absorption band of ammonium ion was large, from which more production of ammonia could be confirmed.

Example 6

$H_2$—SCR in Flow Reactor

Figure 7:
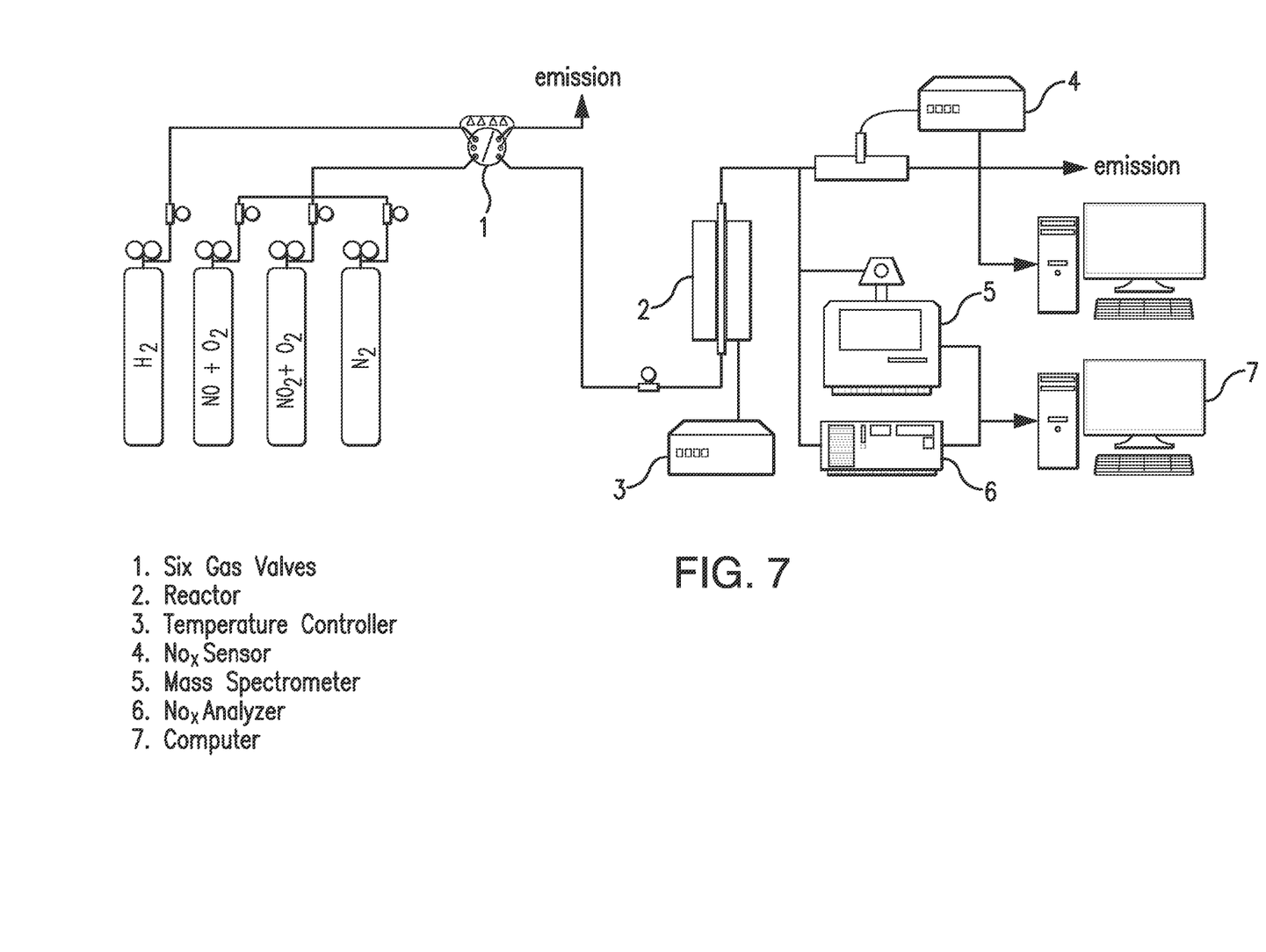
FIG. 7 schematically shows a flow reactor used for $H_2$—SCR.

The $NO_2$ reduction performance of the catalyst using a $H_2$ reducing agent was measured by use of a normal pressure flow reactor. The construction of the flow reactor used in the $H_2$—SCR reaction is shown in FIG. 7. 0.1 g of the Pt-supported catalyst was loaded in a quartz tube having an outer diameter of 10 mm and then activated at 500° C. for 1 hour. In consideration of the temperature of diesel exhaust gas, cooling to 150° C. was performed, and a gas mixture of 520 ppm $NO_2$ by volume and 5% $O_2$ by volume was supplied at a flow rate of 100 ml/min and thus saturated and adsorbed to the catalyst. While the gas mixture of $NO_2$ and $O_2$ was allowed to flow, 2 ml of the $H_2$ reducing agent was injected five times at intervals of 5 min, thus evaluating the $NO_2$ reduction performance. Using a $NO_2$ sensor (NGK, TCNS6005-C3) and a mass spectrometer (Balzer, QMS200) provided to the ends of the reactor, the amount of reduced $NO_2$ and the amount of consumed $H_2$ were measured. As such, not only $NO_x$ but also $N_2O$ and $NH_3$ can be sensed by use of the $NO_2$ sensor provided to the end of the reactor, and thus a decrease in the concentration of $NO_2$ may be connected with conversion of the entirety of $NO_2$ into $N_2$. Using the mass spectrometer, it could be seen to produce $H_2$ at m/e of 2 and water at m/e of 17 and 18. The m/e of NO is 44, and thus the amount of $NO_2$ converted into NO can be detected. The amount of supported precious metal, partial pressure of $O_2$, and activity of Pd-supported catalyst were evaluated.

Figure 8A:
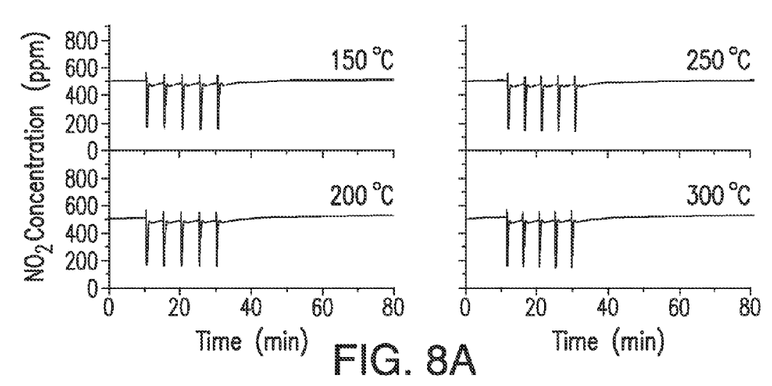
Figure 8B:
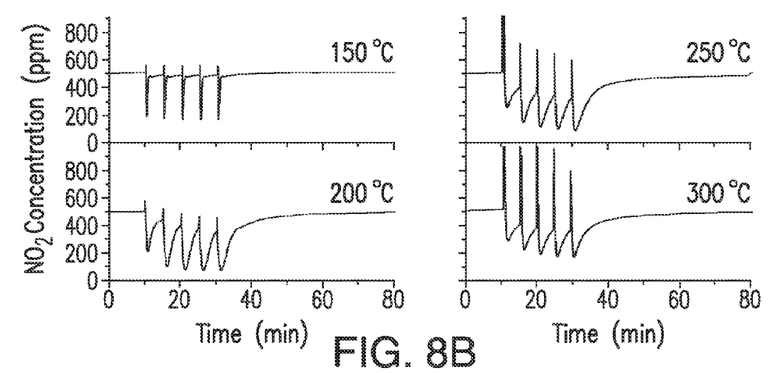
Figure 8C:
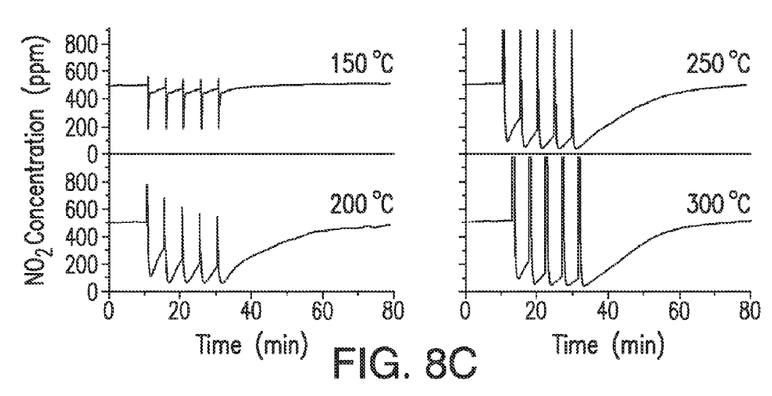

FIG. 8 shows the results of $H_2$—SCR reaction in the Pt(2.0)-Fe catalyst (a), the Pt(2.0)-Mn catalyst (b) and the Pt(2.0)-Fe—Mn catalyst (c) under conditions of 10% $O_2$. $H_2$ was supplied to the $NO_2$ gas at a predetermined flow rate, thus measuring the $NO_2$ conversion. The SCR performance by $H_2$ in the metal oxides alone and in combinations thereof greatly varied. Specifically, in the Pt(2.0)-Fe catalyst, the reduction reaction using $H_2$ was barely performed at 150~300° C. Also in the Pt(2.0)-Mn catalyst, the reduction reaction was barely performed even in the presence of $H_2$ at 150° C., but the $NO_2$ reduction reaction using $H_2$ proceeded at 200~250° C. Because of the injection of $H_2$, part of the $NO_2$ was desorbed from the surface of the catalyst and thus the concentration of $NO_2$ became larger than the initial concentration, but was immediately decreased and thus $NO_2$ was reduced. However, at 300° C., in lieu of the reduction reaction, the $NO_2$ desorption became extreme due to the injection of $H_2$. The reaction results for the Pt(2.0)-Fe—Mn catalyst which is a mixed catalyst of Fe and Mn are shown in (c) of FIG. 8. At 150° C., the $NO_2$ reduction reaction using $H_2$ slightly proceeded, but considerably progressed due to the injection of $H_2$ at 200° C., thus remarkably lowering the concentration of $NO_2$. At 250~300° C., part of $NO_2$ was desorbed because of the injection of $H_2$ but the reduction reaction considerably proceeded. The reduction performance of the catalyst at 200~300° C. was evaluated to be superior to the extent that the concentration of $NO_2$ was close to zero.

TABLE 2

$NO_2$ Reduction by $H_2$ in Pt- or Pd-supported Mixed Oxide Catalyst

| Catalyst | Loaded Amount (g) | $O_2$ Content (%) | Temp. (° C.) | Removal Limit. (ppm) | $NO_2$ Convers. (%) | $H_2$ Effi. (%) |
|---|---|---|---|---|---|---|
| Pt(0.2)—Fe—Mn | 0.1 | 5[a] | 150 | 371 | 8 | 1 |
| | | | 200 | 231 | 18 | 2 |
| | | | 250 | 317 | 14 | 2 |
| | | | 300 | 188 | 42 | 5 |
| Pt(2.0)—Fe—Mn | " | " | 150 | 385 | 17 | 2 |
| | | | 200 | 34 | 124 | 16 |
| | | | 250 | 21 | 128 | 17 |
| | | | 300 | 30 | 89 | 12 |
| Pt(2.0)—Cu—Mn | " | " | 150 | 386 | 8 | 1 |
| | | | 200 | 374 | 2 | 1 |
| | | | 250 | 385 | 15 | 2 |
| | | | 300 | 394 | 17 | 2 |
| Pt(2.0)—Cu—Mo | " | " | 150 | 384 | 10 | 1 |
| | | | 200 | 385 | 14 | 2 |
| | | | 250 | 379 | 14 | 2 |
| | | | 300 | 364 | 16 | 2 |
| Pd(2.0)—Fe—Mn | " | " | 150 | 355 | 7 | 1 |
| | | | 200 | 32 | 129 | 17 |
| | | | 250 | 43 | 112 | 15 |
| | | | 300 | 72 | 87 | 12 |
| Pd(2.0)—Cu—Cr | " | " | 150 | 374 | 14 | 2 |
| | | | 200 | 188 | 34 | 5 |
| | | | 250 | 159 | 72 | 10 |
| | | | 300 | 248 | 21 | 3 |
| Pt(2.0)—Fe | " | 10[b] | 150 | 470 | 7 | 1 |
| | | | 200 | 475 | 3 | 1 |
| | | | 250 | 463 | 11 | 1 |
| | | | 300 | 475 | 1 | 0 |
| Pt(2.0)—Mn | " | " | 150 | 299 | 7 | 1 |
| | | | 200 | 58 | 60 | 8 |
| | | | 250 | 68 | 59 | 8 |
| | | | 300 | 146 | 39 | 5 |
| Pt(2.0)—Fe—Mn | " | " | 150 | 379 | 8 | 1 |
| | | | 200 | 53 | 108 | 14 |
| | | | 250 | 26 | 109 | 14 |
| | | | 300 | 33 | 79 | 10 |

Note:
$NO_2$ gas:
[a]$NO_2$ 505 ppm/$O_2$ 5%/$N_2$ balance
[b]$NO_2$ 524 ppm/$O_2$ 10%/$N_2$ balance As seen in FIG. 8 showing the $NO_2$ reduction using $H_2$ removal limitation, $NO_2$ conversion and $H_2$ efficiency were calculated. The removal efficiency represents the minimum concentration of $NO_2$ lowered due to the injection of $H_2$. The $NO_2$ conversion and the $H_2$ efficiency are defined as Equations 1 and 2 below.

$$\frac{\text{number of moles of } NO_2 \text{ reduced}}{\text{number of moles of } NO_2 \text{ fed for 25 min}} \times 100 \quad \text{Equation 1}$$

$$\frac{\text{number of moles of } NO_2 \text{ reduced}}{\text{number of moles of } H_2 \text{ injected}} \times 100 \quad \text{Equation 2}$$

As above, the results of $NO_2$ reduction by injecting $H_2$ to the flow of $NO_2$ in the presence of 5% $O_2$ and 10% $O_2$ by volume are shown in Table 2. As is apparent from these results, the $NO_2$ reduction performance could be seen to greatly vary depending on the amount of supported precious metal, the kind of precious metal, and the component of mixed oxide. When the $O_2$ content was 5%, the Pt(0.2)-Fe—Mn catalyst in which Pt was supported in an amount of 0.2% by weight exhibited the $NO_2$ conversion of 8~42% at 150~300° C., which was not so high. However, the Pt(2.0)-Fe—Mn catalyst in which the amount of supported Pt was 2.0% had the $NO_2$ conversion of 17% at 150° C. but exhibited the $NO_2$ conversion exceeding 100% at 200° C. and 250° C. When the amount of supported Pt was not 0.2% but 2.0%, the $NO_2$ reduction performance was superior. The effect of increasing the $NO_2$ conversion exceeding 100% is caused by reducing the fed $NO_2$ by produced ammonia, adsorbing the remaining ammonia to the surface of the catalyst or removing lattice 0 from the surface of the catalyst to thus additionally remove $NO_2$. Because ammonia is produced from $NO_2$ and is used to remove $NO_2$, the point of time at which $H_2$ is supplied does not agree with the point of time at which $NO_2$ is removed.

In the Pt(2.0)-Cu—Mn catalyst and the Pt(2.0)-Cu—Mo catalyst, having different components, the $NO_2$ conversion was very low to the level of 2~17%. On the other hand, the Pd(2.0)-Fe—Mn catalyst in which Pd was supported in place of Pt had the reduction performance similar to that of the Pt(2.0)-Fe—Mn catalyst, and thus exhibited the $NO_2$ conversion of 129% at 200° C. which was evaluated to be very high. The Pd(2.0)-Cu—Cr catalyst exhibited the $NO_2$ conversion of 72% at 250° C., which was smaller than that of the Pd(2.0)-Fe—Mn catalyst but was evaluated to be high. As shown in FIG. 7, for a considerably long period of time after completion of the injection of $H_2$, the phenomenon in which the concentration of $NO_2$ is lowered, briefly, the reduction reaction, slowly proceeds. This is because the produced ammonia reduces the surface of the catalyst to thus produce $NO_x$ adsorption sites or is adsorbed unchanged and then reacted with fed $NO_x$.

The mixed oxide catalyst, for example, the Pt(2.0)-Fe—Mn catalyst, exhibiting excellent performance in the presence of 5% $O_2$, was evaluated for reduction performance under an excessive $O_2$ content of 10%. In the Pt(2.0)-Fe catalyst, the $NO_2$ conversion was very low on the order of 10% or less. In the Pt(2.0)-Mn catalyst, the $NO_2$ conversion was considerably high on the order of 60%. In the Pt(2.0)-Fe—Mn catalyst, the $NO_2$ conversion exceeded 100% and the removal limitation was very low on the order of 26 ppm. Even under an excessive $O_2$ content of 10%, the $NO_2$ reduction performance was superior.

Example 7

Figure 9:
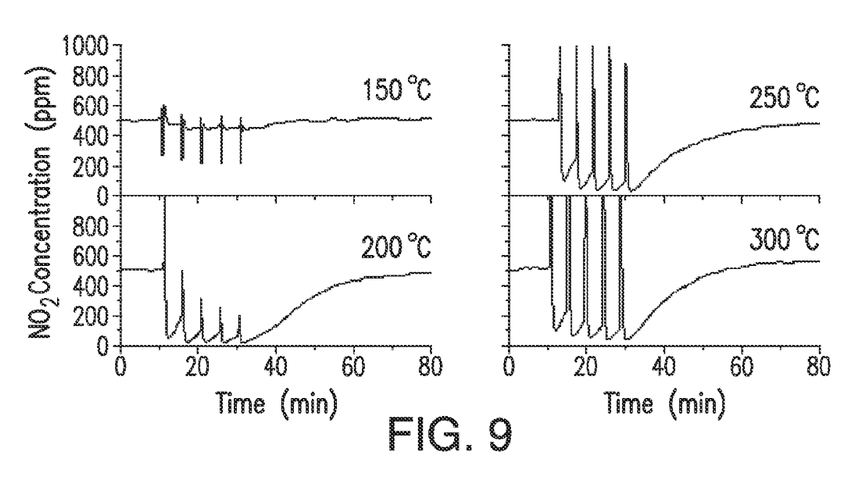
FIG. 9 shows $NO_2$ reduction behavior by $H_2$ of the Pt(2.0)-Fe—Mn catalyst with Fe-BEA zeolite.

$H_2$—SCR in Reactor packed with Precious Metal-Supported Mixed Oxide Catalyst and $NH_3$—SCR Catalyst The reactor was packed with the Pt(2.0)-Fe—Mn catalyst having superior $NO_2$ reduction performance by $H_2$ in Table 2 and the $NH_3$—SCR catalyst prepared in Example 1, for example, the Fe-BEA zeolite, and $NO_2$ reduction performance by $H_2$ was evaluated. As shown in FIG. 9, almost all of $NO_2$ was removed at 200~300° C. due to injection of $H_2$. After completion of the injection of $H_2$, the concentration of $NO_2$ was maintained low for a considerably long period of time, from which the reduction performance was evaluated to be high. The reaction results are shown in Table 3 below. At 200° C., the $NO_2$ conversion was 133% which was evaluated to be very high.

TABLE 3

$NO_2$ Reduction by $H_2$ in Reactor packed with Fe-BEA Zeolite and Mixed Oxide Catalyst

| Catalyst | Loaded Amount | $O_2$ Content (%) | Temp. (° C.) | Removal Limit. (ppm) | $NO_2$ Convers. (%) | $H_2$ Effi. (%) |
|---|---|---|---|---|---|---|
| Pt(2.0)—Fe—Mn | 0.1 g | 10 | 150 | 379 | 8 | 1 |
| | | | 200 | 53 | 108 | 14 |
| | | | 250 | 26 | 109 | 14 |
| | | | 300 | 33 | 79 | 10 |
| Pt(2.0)—Fe—Mn + Fe-BEA | Each 0.1 g, Total 0.2 g | " | 150 | 372 | 10 | 1 |
| | | | 200 | 24 | 133 | 16 |
| | | | 250 | 26 | 111 | 14 |
| | | | 300 | 33 | 91 | 11 |

Note:
$NO_2$ gas: $NO_2$ 505 ppm/$O_2$ 10%/$N_2$ balance

Example 8

Hydrothermal Treatment of Mixed Oxide Catalyst

In diesel exhaust gas containing a considerable amount of water, when the temperature of exhaust gas is widely changed depending on driving conditions, the catalyst should be used without exchange for a long period of time and thus should have high hydrothermal stability. Thus, the hydrothermal stability of the mixed oxide catalyst was evaluated.

The precious metal-supported mixed oxide catalyst was loaded in an alumina crucible, and was placed in a quartz tube of a circular burning furnace and thus subjected to hydrothermal treatment. Then, $N_2$ was allowed to flow into a steam evaporator in a precision constant temperature circulator, thus preparing and supplying a gas mixture containing $N_2$ and 10% steam by volume. While the $N_2$ gas containing steam was supplied at a flow rate of 100 ml/min, the treatment was performed at 750° C. for 4 hours.

The catalyst was washed with water and the decrease in the activity of the mixed oxide catalyst was evaluated. 10 g of the Pt(2.0)-Fe—Mn catalyst as the Pt-supported catalyst was added to 1000 g of water, strongly stirred at room temperature, treated for 1 hour, filtered using filter paper and then dried in an oven at 80° C.

TABLE 4

Amount of $NO_2$ Stored on Pt-supported Mixed Oxide Catalyst after Waste Treatment & Hydrothermal Treatment

| | $NO_2$ Adsorption Amount (mg/g) | |
|---|---|---|
| Catalyst | Adsorption Amount | Storage Amount |
| Pt (2.0)—Fe—Mn | 182 | 181 |
| Pt (2.0)—Fe—Mn (Water Treatment) | 72 | 66 |
| Pt (2.0)—Fe—Mn (Hydrothermal Treatment) | 84 | 82 |

The amount of $NO_2$ stored on the Pt(2.0)-Fe—Mn catalyst subjected to water treatment and hydrothermal treatment is shown in Table 4. The amount of stored $NO_2$ through water treatment and hydrothermal treatment was lowered from 181 mg/g to 66 mg/g and 82 mg/g respectively. The amount of stored $NO_2$ was considerably lowered through hydrothermal treatment.

Table 5 below shows the results of $NO_2$ reduction by $H_2$ in the Pt-supported Fe—Mn catalyst subjected to water treatment and hydrothermal treatment. The reduction performance of the Pt(2.0)-Fe—Mn catalyst subjected to water treatment was similar to that before the treatment. The removal performance was slightly decreased at high temperatures, but was greatly increased at low temperatures. In the conventional Pt(2.0)-Fe—Mn catalyst, the $NO_2$ conversion and the $H_2$ efficiency at 150° C. were 17% and 2% respectively, and thus the removal performance was poor. In the water treated catalyst, the $NO_2$ conversion and the $H_2$ efficiency were considerably increased to 73% and 10% respectively, but were slightly decreased at 250~300° C.

In the Pt(2.0)-Fe—Mn catalyst subjected to hydrothermal treatment, the $NO_2$ reduction performance at 150~200° C. was considerably deteriorated, and was greatly improved at temperatures not lower than 250° C. The Pt(2.0)-Fe—Mn catalyst exhibited had the $NO_2$ conversion and the $H_2$ efficiency of 89% and 12% respectively at 300° C., and the $NO_2$ conversion and the $H_2$ efficiency of the Pt(2.0)-Fe—Mn catalyst subjected to hydrothermal treatment were considerably improved to 121% and 16% respectively.

TABLE 5

$NO_2$ Reduction by $H_2$ in Pt(2.0)—Fe—Mn Catalyst

| Catalyst | Loaded Amount (g) | $O_2$ Content (%) | Temp. (° C.) | Removal Limit. (ppm) | $NO_2$ Convers. (%) | $H_2$ Effi. (%) |
|---|---|---|---|---|---|---|
| Pt(2.0)—Fe—Mn | 0.1 | 5 | 150 | 385 | 17 | 2 |
| | | | 200 | 34 | 124 | 16 |
| | | | 250 | 21 | 128 | 17 |
| | | | 300 | 30 | 89 | 12 |
| Pt(2.0)—Fe—Mn (Water Treatment) | " | " | 150 | 66 | 73 | 10 |
| | | | 200 | 39 | 114 | 15 |
| | | | 250 | 26 | 107 | 14 |
| | | | 300 | 50 | 81 | 11 |
| Pt(2.0)—Fe—Mn (Hydrothermal Treatment) | " | " | 150 | 450 | 2 | 1 |
| | | | 200 | 147 | 28 | 4 |
| | | | 250 | 86 | 84 | 11 |
| | | | 300 | 39 | 121 | 16 |

Example 9

Durability of Precious Metal-Supported Mixed Oxide Catalyst to Sulfur Poisoning The diesel exhaust gas contains sulfur compounds including $SO_2$, undesirably deteriorating the activity of the catalyst.

To evaluate the durability of the precious metal-supported mixed oxide catalyst to sulfur poisoning, the catalyst was poisoned with $SO_2$. The catalyst was exhausted, activated and then sufficiently poisoned with $SO_2$ gas at 10 Torr at 150° C. for 1 hour, before storing $NO_2$. After exhaust for 1 hour, $NO_2$ at 30 Torr was supplied and thus the adsorption amount thereof was measured.

The amount of adsorbed $SO_2$ and the amount of stored $NO_2$ after poisoning are shown in Table 6 below. At 150° C., $SO_2$ was not adsorbed in a large amount. Upon treatment with $SO_2$, the amount of stored $NO_2$ was decreased by almost half.

TABLE 6

Amounts of $SO_2$ and $NO_2$ Stored on Pt (2.0)—Fe—Mn catalyst

| Catalyst | $SO_2$ Adsorption Amount (mg/g) | | $NO_2$ Adsorption Amount (mg/g) | |
|---|---|---|---|---|
| | Before Exhaust | After Exhaust | Before Exhaust | After Exhaust |
| Pt (2.0)—Fe—Mn | — | — | 182 | 181 |
| Pt (2.0)—Fe—Mn (Poisoned) | 13 | 13 | 68 | 64 |

The deterioration in the reduction performance of the precious metal-supported mixed oxide through sulfur poisoning at 150° C. and 200° C. was evaluated. 2 ml of $SO_2$ gas amounting to 8 times that of $NO_2$ supplied for 5 min after $NO_2$ saturation and adsorption was injected, thus poisoning the catalyst. Subsequently, $H_2$ was injected and thus the deterioration in the activity of the catalyst was measured.

The $NO_2$ removal performance by $H_2$ after sulfur poisoning is shown in Table 7 below. The $NO_2$ reduction performance of the Pt(2.0)-Fe—Mn catalyst poisoned with $SO_2$ was almost the same as that before sulfur poisoning. The $NO_2$ conversion and the $H_2$ efficiency were slightly decreased, but the $NO_2$ removal limitation at 200° C. was 35 ppm which was equivalent to that before sulfur poisoning.

TABLE 7

$NO_2$ Reduction by $H_2$ in Pt(2.0)—Fe—Mn Catalyst poisoned with Sulfur

| Catalyst | Loaded Amount (g) | $O_2$ Content (%) | Temp. (° C.) | Removal Limit. (ppm) | $NO_2$ Convers. (%) | $H_2$ Effi. (%) |
|---|---|---|---|---|---|---|
| Pt(2.0)—Fe—Mn | 0.1 | 5 | 150 | 385 | 17 | 1 |
| | | | 200 | 34 | 124 | 16 |
| Pt(2.0)—Fe—Mn (Poisoned) | " | " | 150 | 285 | 15 | 2 |
| | | | 200 | 35 | 108 | 14 |

The invention claimed is:

1. A method of reducing $NO_x$, comprising contacting $NO_x$ at from 150 to 350° C. with $H_2$ as a reducing agent in the presence of a mixed oxide catalyst comprising $Fe_2O_3$; and $MnO_2$, which are co-precipitated and mixed.

2. The method according to claim 1, wherein the method is performed under conditions in which $O_2$ content is equal to or less than 10% by volume based on a volume of the $NO_x$.

3. The method according to claim 1, wherein a precious metal selected from the group consisting of platinum and palladium is supported in an amount of from 0.1 to 2 wt % on the mixed oxide catalyst.

4. The method according to claim 3, wherein an ammonia-selective catalytic reduction catalyst is further included in the mixed oxide catalyst.

* * * * *